United States Patent Office 3,637,798

Patented Jan. 25, 1972

3,637,798

CARBOXY 9-DICYANOMETHYLENE NITROFLUORENE

Theodore Sulzberg, South Piscataway, and Robert J. Cotter, Bernardsville, N.J., assignors to Union Carbide Corporation, New York, N.Y.

No Drawing. Filed Sept. 23, 1968, Ser. No. 761,845

Int. Cl. C07c *121/66*

U.S. Cl. 260—465 15 Claims

ABSTRACT OF THE DISCLOSURE

Fluorenes have been prepared containing a dicyanomethylene group in the 9 position. In addition, the 2, 4, 5, and 7 positions contain carboxyl, carboxyl derivatives, nitro, or hydrogen substituents with the proviso that there is at least one carboxyl or carboxyl derivative in one of these positions. The electron accepting properties of these compounds and derived polymers make them useful for traps or filters for electron-rich compounds and as ultraviolet absorbers. These fluorene acceptor monomers and derived polymers, readily form charge-transfer complexes with a wide variety of Pi or Lewis bases which are useful as coloring agents, as electrical conducting materials and as ultra-violet absorbers.

This invention relates to substituted fluorenes having a dicyanomethylene group in the 9 position and at least one carboxyl or carboxyl derivative in the 2, 4, 5, or 7 position with other optional substituents in these positions including carboxyl, carboxyl derivative, nitro ($NO_2$) and the like.

These novel fluorenes may be represented by the formula below:

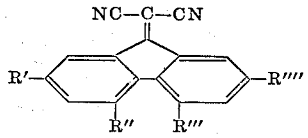

wherein each of R′, R″, R‴, and R⁗, is selected from the group consisting of COOH, COX, $CO_2$-alkyl, $NO_2$, and H wherein X is halogen, (F, Cl, Br or I) and the alkyl contains 1 to 10 carbon atoms with the proviso that at least one of R′, R″, R‴, R⁗ is COOH, COX or $CO_2$-alkyl. The preferred carboxyl derivative groups include acyl halides and in particular acyl chlorides, as well as carbalkoxy groups containing from 1 to about 10 carbon atoms in the alkyl ester moiety.

These fluorenes, which are generally yellow to orange solids, have electron-accepting properties which make them useful for the preparation of charge-transfer salts by complexing with electron donating materials. The fluorenes containing one carboxyl group can be reacted with high polymers containing hydroxyl groups such as poly(vinyl alcohol), cellulose, poly(hydroxyalkyl acrylates) and the like, thereby introducing electron accepting sites into the backbone of said linear high polymers. The fluorenes containing two carboxyl groups or carboxyl derivatives can be polymerized via suitable condensation methods to yield polymers having electron accepting properties.

The polymeric materials derived from both the mono- and dicarboxylic fluorene compounds are, like their precursor monomeric species, inherently colored with absorption maxima between 350–400 mμ. Further, being both thermally and hydrolytically stable the films and fibers from these electron accepting polymers can be used under a wide variety of conditions. A typical example is the forming of fiber-like traps or filters which can remove adulterants or impurities from gases, smoke and especially from polluted air. Compounds, particularly those electron rich materials such as benzene, benzanthracene amines and ethers, tend to complex with these strongly electron-accepting polymeric materials and are thereby removed from the prevailing atmosphere.

The dicyanomethylenefluorene compounds and their polymers readily form charge-transfer complexes with both Pi bases (R. S. Mulliken J. Am. Chem. Soc. 74, 811 (1952) and Lewis bases (G. N. Lewis, J. Franklin Inst. 226,293 (1938)). These complexes are, like the fluorene acceptors, thermally and hydrolytically stable but are also very deeply colored. The color, which is a function of the Pi or Lewis base used, can vary from yellow-orange to green to black or any intermediate point in the visible spectrum. The wide choice of colors available makes these charge-transfer complexes especially valuable in films, paints and fibers as coloring agents, dyes and/or pigments. Even more important, the complexes formed from polymeric acceptors are not soluble in the usual solvents that tend to give leaching and crocking problems with the ordinary monomeric dyes and pigments.

Another interesting property of some of these complexes is that actual electron transfer occurs giving rise to a radical cation-radical anion species. These species, which generally occur with the Lewis bases, exhibit electron para magnetic resonance signals of varying intensity and volume resistivities typical of semi-conductors.

Due to their inherent color and absorbing characteristics, both the dicyanomethylenefluorenes and their charge-transfer complexes are useful as ultra-violet absorbers for many applications. The intensity of their absorbances allows them to be used in very small quantities. This is especially valuable when using the polymeric dicyanomethylenefluorenes and their charge-transfer complexes since it eliminates potential compatibility problems.

The magnitude of the electron accepting properties of these fluorenes can be determined by studing their charge-transfer spectra with a group of condensed aromatic hydrocarbons using the method developed by M. J. S. Dewar et al. (J. Am. Chem. Soc., 83, 4560 (1961)). This method is based on simple molecular orbital theory which states that a charge-transfer spectrum arises from an electronic transition from the highest occupied molecular orbital of the donor to the lowest vacant molecular orbital of the acceptor. If the same acceptor is used in a series of complexes with different donors, one derives the expression:

$$\Delta E = \text{constant} - n\beta$$

where ΔE is the energy of the charge-transfer transition, $\beta$ is the resonance integral and $n$ is a coefficient of $\beta$. Since ΔE is proportional to spectral frequency, a plot of the observed charge-transfer frequency againt the calculated $n$ values of the donors gives a straight line (see C. A. Coluson et al., "Dictionary of Values of Molecular Constance," 2nd edition, Mathematical Institute, Oxford, England and the centre de Macanique Ondulatoire Applique, Paris, France, 1959). Furthermore the $y$ intercept of the line represents the energy level of the acceptors lowest vacant molecular orbital ($n$ value for acceptor) and a comparison of these values for various acceptors leads to a list of relative strengths.

The invention is further described in the examples which follow. All parts and percentages are by weight unless otherwise specified.

EXAMPLE 1

Preparation of 9-dicyanomethylenefluorene-2,7-dicarboxylic acid

A mixture 2.7 g. (0.01 m.) fluorenone-2,7-dicarboxylic acid and 250 ml. of methanol were heated to reflux. Malononitrile (2.0 g., 0.03 m.) and 2 drops of piperidine were added. The slurry turned from yellow to orange after 17 hours at reflux. The reaction mixture was cooled and the solid filtered. The product, which melted at 312–316° C., was collected in 68% yield (2.15 g.).

*Analysis.*—Calc'd for $C_{18}H_8N_2O_4$ (percent): C, 68.36; H, 2.55; N, 8.86; O, 20.23. Found (percent): C, 69.45; H, 2.88; N, 8.46; O, 17.25.

EXAMPLE 2

Preparation of dimethyl-9-dicyanomethylene-fluorene-2,7-dicarboxylate

Dimethylfluorenone-2,7-dicarboxylate (3.0 g., 0.01 m.) and 250 ml. of methanol were heated to reflux. Malononitrile (2.0 g., 0.03 m.) and 2 drops of piperidine was added and heating continued for one hour. The reaction mixture was cooled, the organic solid collected and recrystallized from acetonitrile-dimethylformamide to give 2.5 g. (74%) of product melting at 275–8° C. An infrared spectrum had a cyano band at 4.48 microns.

*Analysis.*—Calc'd for $C_{20}H_{12}N_2O_4$ (percent): C, 69.77; H, 3.51; N, 8.14; 0. 18.58. Found (percent): C, 69.59; H, 3.63; N, 7.37; O, 19.47.

Dimethyl - 9 - dicyanomethylenefluorene - 2,7 - dicarboxylate was also prepared in 76% yield by using dimethyl sulfoxide as solvent at 130° C.

EXAMPLE 3

Preparation of 4,5-dinitrofluoroenone-2,7-dicarboxylic acid

A heated solution of 5.4 g. (0.02 m.) of fluorenone-2,7-dicarboxylic acid in 40 ml. of concentrated sulfuric acid, which was a deep red, was added dropwise over a 10 minute period to a refluxing mixture (85° C.) of 65 ml. of fuming nitric acid and 40 ml. of concentrated sulfuric acid. A mixture of 45 ml. of fuming nitric acid and 55 ml. of concentrated sulfuric acid was added dropwise over a 4.5 hour period. The reaction, which was cooled to room temperature and stirred overnight, was poured onto one liter of ice-water to give a pale-yellow solid. It was collected, water washed and dried at 70° C./1 mm. The 4,5-dinitrofluorenone-2,7-dicarboxylic acid (5.2 g., 75%) had a melting point of 285–294° C. (dec.).

*Analysis.*—Calc'd for $C_{15}H_6N_2O_9$ (percent): C, 50.29; H, 1.69; N, 7.82; O, 40.20. Found (percent): C, 48.44; H, 2.23; N, 8.77; O, 40.58.

EXAMPLE 4

Preparation of dimethyl 4,5-dinitrofluoroenone-2,7-dicarboxylate

A mixture of 3.0 g. (0.0084 m.) of 4,5-dinitrofluorenone-2,7-dicarboxylic acid, 6 ml. of conc. sulfuric acid and 60 ml. of methanol was heated at reflux for 18 hours. The solution was cooled, the solid filtered, washed with water and dried to give 2.1 g. (66%) of dimethyl 4,5-dinitrofluorenone-2,7-dicarboxylate. After recrystallization from toluene-ethanol it melted at 252–255° C.

*Analysis.*—Calc'd for $C_{17}H_{10}N_2O_9$ (percent): C, 52.86; H, 2.61; N, 7.25; O, 37.28. Found (percent): C, 52.16; H, 2.55; N, 8.17; O, 37.12.

EXAMPLE 5

Preparation of 4,5-dinitro-9-dicyanomethylene-fluorene-2,7-dicarboxylic acid

After a mixture of 14.4 g. (0.04 m.) of 4,5-dinitrofluorenone-2,7-dicarboxylic acid and 400 ml. of methanol were heated to reflux, 8.0 g. (0.12 m.) of malononitrile and 8 drops of piperidine were added. After 1½ hours at reflux, the solution was cooled in the cold room and 5.4 g. (33%) of an orange solid was collected, M.P. 345° C.

*Analysis.*—Calc'd for $C_{18}H_6N_4O_8$ (percent): C, 53.22; H, 1.49; N, 13.79; O, 31.50. Found (percent): C, 53.19; H, 1.55; N, 13.81; O, 31.38.

EXAMPLE 6

Preparation of 4,5-dinitro-9-dicyanomethylene-fluorene-2,7-dicarboxylic acid chloride 4,5 - dinitro - 9 - dicyanomethylenefluorene - 2,7-dicarboxylic acid (1.6 g., 0.004 m.) and 25 ml. of thionyl-chloride were heated at reflux for 5 hours. The excess thionyl chloride was removed by distillation and the residue recrystallized from toluene to give 1.5 g. (84%) yield of diacid chloride, M.P. 262–264° C.

*Analysis.*—Calc'd for $C_{18}H_4Cl_2N_4O_6$ (percent): C, 48.79; H, 0.91; Cl, 15.99; N, 12.64; O, 21.66. Found (percent): C, 48.75; H, 1.22; Cl, 15.73; N, 12.48; O, 21.76.

EXAMPLE 7

Preparation of dimethyl-4,5-dinitro-9-dicyano-methylenefluorene-2,7-dicarboxylate Dimethyl-4,5 - dinitrofluorenone - 2,7 - dicarboxylate (3.0 g., 0.0078 m.) and 200 ml. of methanol were heated to reflux. Malononitrile (1.4 g., 0.021 m.) and 3 drops of piperidine were added and the solution changed from orange to red-purple in color. After refluxing for 2 days, the solution was cooled and the deep orange solid collected. The dimethyl - 4,5 - dinitro-9-dicyanomethylene-fluorene-2,7-dicarboxylate (1.8 g., 53%) melted at 280–1° C. on recrystallization from acetonitrile.

*Analysis.*—Calc'd for $C_{20}H_{10}N_4O_8$ (percent): C, 55.31; H, 2.32; N, 12.90; O, 29.47. Found (percent): C, 55.19; H, 2.36; N, 13.34; O, 29.30.

EXAMPLE 8

Preparation of 4,5,7-trinitrofluorenone-2-carboxylic acid

A solution of 10 g. (0.04 m.) of fluorenone-2-carboxylic acid in 80 ml. of concentrated sulfuric acid, which was red in color, was added dropwise over a 10 minute period to a refluxing mixture (85° C.) of 130 ml. of fuming nitric acid and 80 ml. of concentrated sulfuric acid. A mixture of 90 ml. of fuming nitric acid and 110 ml. of concentrated sulfuric acid was added dropwise over a 4.5 hour period. After cooling to room temperature the reaction mixture was stirred overnight, poured onto 1.5 liters of ice-water and the yellow solid collected. After washing with a 5% sodium bicarbonate solution and water, the solid was dried overnight at 90° C./vac. This afforded 12.2 g. (85%) of 4,5,7-trinitrofluorenone-2-carboxylic acid melting at 267–275° C.

*Analysis.*—Calc'd for $C_{14}H_5N_3O_9$ (percent): C, 46.81; H, 1.40; N, 11.70; O, 40.09. Found (percent): C, 46.10; H, 1.98; N, 11.43; O, 40.71.

EXAMPLE 9

Preparation of methyl-4,5,7-trinitrofluorenone-2-carboxylate

A mixture of 4.0 g. (0.0027 m.) of 4,5,7-trinitrofluorenone-2-carboxylic acid, 200 ml. of dry methanol and 5 ml. of concentrated sulfuric acid was refluxed for 24 hours. The solution was cooled to afford 2.8 g. (68%) of the yellow, crystalline methyl-4,5,7-trinitrofluorenone-2-carboxylate melting at 175–8°.

*Analysis.*—Calc'd for $C_{15}H_7N_3O_9$ (percent): C, 48.27; H, 1.89; N, 11.26; O, 38.58. Found (percent): C, 48.27; H, 1.83; N, 11.26; O, 38.73.

The N.M.R. Spectrum of the aromatic region of this ester showed 4 sets of doublets from 8.97 to 8.50 p.p.m. in a ratio of 1:1:1:1. The downfield pair, which were assigned to protons 6 and 8, had a J=2.2 while the other pair had a J=1.6. The three methyl ester protons appeared at 4.02 p.p.m.

EXAMPLE 10

Preparation of 4,5,7-trinitro-9-dicyanomethylene fluorene-2-carboxylic acid

To a refluxing mixture of 7.0 g. (0.017 m.) of 4,5,7-trinitrofluorenone-2-carboxylic acid and 200 ml. of dry methanol, 2.2 g. (0.034 m.) of malononitrile and 3 drops of piperidine were added. After 24 hours, the solution was cooled to room temperature and filtered to afford 4.7 g. (60%) of orange 4,5,7-trinitro-9-dicyanomethylenefluorene-2-carboxylic acid, M.P. 307–310° C.

*Analysis*.—Calc'd for $C_{17}H_5N_5O_8$ (percent): C, 50.14; H, 1.24; N, 17.19; O, 31.43. Found (percent): C, 49.98; H, 1.58; N, 16.93; O, 31.51.

EXAMPLE 11

Preparation of 4,5,7-trinitro-9-dicyanomethylenefluorene-2-carboxylic acid chloride A mixture of 1.0 g. (0.0024 m.) of 4,5,7-trinitro-9-dicyanomethylenefluorene-2-carboxylic acid and 25 ml. of thionyl chloride was refluxed for 18 hours. The excess thionyl chloride was removed under reduced pressure and the residue recrystallized from toluene to give 0.2 g. (20%) of a solid melting at 292–300° C.

*Analysis*.—Calc'd for $C_{17}H_4ClN_5O_7$ (percent): C, 47.97; H, 0.95; Cl, 8.33; N, 16.45; O, 26.31. Found (percent): C, 50.50; H, 1.47; Cl, 6.46; N, 16.40; O, 25.25.

EXAMPLE 12

Preparation of methyl-4,5,7-trinitro-9-dicyanomethylenefluorene-2-carboxylate

To a mixture of methyl-4,5,7-trinitrofluorenone-2-carboxylate (1.0 g., 0.0027 m.) and 75 ml. of methanol at reflux, 0.4 g. (0.003 m.) of malononitrile and one drop of piperidine were added. After 4 hours, the solution was concentrated to ½ the volume and cooled overnight in the cold room. Filtration afforded 0.85 g. (66%) of methyl-4,5,7 - trinitro - 9 - dicyanomethylenefluorene-2-carboxylate melting at 269–272° C.

*Analysis*.—Calc'd for $C_{18}H_7N_5O_8$ (percent): C, 51.32; H, 1.68; N, 16.62; O, 30.38. Found (percent): C, 50.81; H, 2.02; N, 16.54; O, 30.48.

EXAMPLE 13

Preparation of 2,5,7-trinitrofluorenone-4-carboxylic acid

By a procedure analogous to the preparation of 4,5,7-trinitrofluorenone-2-carboxylic acid, there was obtained 8.5 g. (59%) of 2,5,7 - trinitrofluorenone-4-carboxylic acid from fluorenone-4-carboxylic acid. The compound melted at 256–61° C.

*Analysis*.—Calc'd for $C_{14}H_5N_3O_9$ (percent): C, 46.81; H, 1.40; N, 11.70; O, 40.08. Found (percent): C, 46.03; H, 1.90; N, 11.31; O, 40.80.

EXAMPLE 14

Preparation of methyl 2,5,7-trinitrofluorenone-4-carboxylate

This compound was prepared in the same way as methyl - 4,5,7 - trinitrofluorenone-2-carboxylate from 2,5,7 - trinitrofluorenone-4-carboxylic acid. It melted at 183–84° C. and was obtained in 22% yield (0.9 g.).

*Analysis*.—Calc'd for $C_{15}H_7N_3O_9$ (percent): C, 48.27; H, 1.89; N, 11.26; O, 38.58. Found (percent): C, 48.31; H, 2.20; N, 11.16; O, 38.58.

EXAMPLE 15

Preparation of 2,5,7-trinitro-9-dicyanomethylenefluorene-4-carboxylic acid

To a refluxing mixture of 4.5 g. (0.11 m.) of 2,5,7-trinitrofluorenone-4-carboxylic acid and 200 ml. of methanol, 1.5 g. (0.022 m.) of malononitrile and 3 drops of piperidine were added. After refluxing for 24 hours, the solution was cooled in an ice bath and the orange solid collected. The 2.0 g. yield of 2,5,7-trinitro-9-dicyanomethylenefluorene-4-carboxylic acid melted at 313–5° C.

*Analysis*.—Calc'd for $C_{17}H_5N_5O_8$ (percent): C, 50.14; H, 1.24; N, 17.19; O, 31.43. Found (percent): C, 49.92; H, 1.89; N, 17.09; O, 31.20.

EXAMPLE 16

Preparation of 2,5,7-trinitro-9-dicyanomethylenefluorene-4-carboxylic acid chloride A mixture of 1.0 g. (0.0024 m.) of 2,5,7-trinitro-9-dicyanomethylenefluorene-4-carboxylic acid and 25 ml. of thionyl chloride were refluxed for 18 hours. The excess thionyl chloride was removed under reduced pressure and the residue recrystallized from toluene to give a low yield (<10%) of a solid melting at 293–294° C.

*Analysis*.—Calc'd for $C_{17}H_4ClN_5O_7$ (percent): C, 47.97; H, 0.95; Cl, 8.33; N, 16.45; O, 26.31. Found (percent): C, 48.50; H, 1.26; Cl, 7.84; N, 16.47; O, 25.32.

EXAMPLE 17

Preparation of 2,5,7-trinitro-9-dicyanomethylenefluorene-4-carboxylate

Malononitrile (0.2 g. 0.003 m.) and one drop of piperidine were added to a refluxing mixture of 0.5 g. (0.0013 m.) of methyl-2,5,7-trinitrofluorenone-4-carboxylate and 50 ml. of dry methanol. After 4 hours, the mixture was concentrated to one-half the volume and cooled overnight in the cold room. Filtration gave 0.40 g. (57%) of methyl-2,5,7-trinitro - 9 - dicyanomethylenefluorene-4-carboxylate melting at 285–7° C.

*Analysis*.—Calc'd for $C_{18}H_7N_5O_8$ (percent): C, 51.32; H, 1.68; N, 16.62; O, 30.38. Found (percent): C, 51.25; H, 1.80; N, 16.22; O, 30.73.

EXAMPLE 18

Preparation of 9-dicyanomethylenefluorene-2-carboxylic acid

A mixture of 10 g. (0.04 mole) of fluorenone-2-carboxylic acid, 500 ml. of methanol, 8 g. (0.12 m.) of malononitrile and 8 drops of piperidine is refluxed for about 24 hours. Upon cooling and filtering 9-dicyanomethylenefluorene-2-carboxylic acid is obtained.

EXAMPLE 19

Preparation of 9-dicyanomethylenefluorene-4-carboxylic acid

A mixture of 10 g. (0.04 m.) of fluorenone-4-carboxylic acid, 500 ml. of methanol, 8 g. (0.12 m.) of malononitrile and 8 drops of piperidine is refluxed for about 24 hours. Upon cooling and filtering 9-dicyanomethylenefluorene-4-carboxylic acid is obtained.

Although the invention has been described in its preferred form, it is understood that the present disclosure has been made only by way of example, and that numerous changes in the details may be resorted to without departing from the spirit and scope of the invention.

What is claimed is:

1. A fluorene compound having the formula:

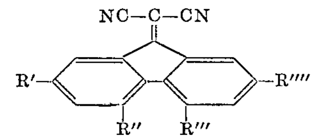

wherein each of R′, R″, R‴, R″″ is selected from the group consisting of COOH, COX, $CO_2$-alkyl, $NO_2$, and H wherein X is halogen and the alkyl contains 1 to 10 carbon atoms with the proviso that at least one of R′, R″, R‴, R″″ is COOH, COX, or $CO_2$-alkyl.

2. The fluorene claimed in claim 1 wherein R′ is COOH and R″, R‴, and R″″ are each H.

3. The fluorene claimed in claim 1 wherein R″ is COOH and R′, R‴ and R″″ are each H.

4. The fluorene claimed in claim 1 wherein R′ and R″″ are each COOH and R″ and R‴ are each H.

5. The fluorene claimed in claim 1 wherein R′ and R″″ are each $CO_2$-alkyl and R″ and R‴ are each H.

6. The fluorene claimed in claim 1 wherein R′, R″ and R‴ are each $NO_2$ and R″″ is COOH.

7. The fluorene claimed in claim 1 wherein R′, R″ and R‴ are each $NO_2$ and R⁗ is $CO_2$-alkyl.

8. The fluorene claimed in claim 1 wherein R′, R‴ and R″ are each $NO_2$ and R‴ is COOH.

9. The fluorene claimed in claim 1 wherein R′, R″, R⁗ are each $NO_2$ and R‴ is $CO_2$-alkyl.

10. The fluorene claimed in claim 1 wherein R′ and R⁗ are each COOH and R″ and R‴ are each $NO_2$.

11. The fluorene claimed in claim 1 wherein R′ and R⁗ are each $CO_2$-alkyl and R″ or R‴ are each $NO_2$.

12. The fluorene claimed in claim 5 wherein the alkyl is methyl.

13. The fluorene claimed in claim 7 wherein the alkyl is methyl.

14. The fluorene claimed in claim 9 wherein the alkyl is methyl.

15. The fluorene claimed in claim 11 where the alkyl is methyl.

References Cited

UNITED STATES PATENTS

| | | | |
|---|---|---|---|
| 3,226,388 | 12/1965 | Hartzler | 260—465 |
| 3,452,076 | 6/1969 | Mohr et al. | 260—465 |

CHARLES B. PARKER, Primary Examiner

C. F. WARREN, Assistant Examiner

U.S. Cl. X.R.

23—4; 106—169; 117—33.3; 252—300; 260—45.85, 45.9, 78.4, 224, 465 G